UNITED STATES PATENT OFFICE.

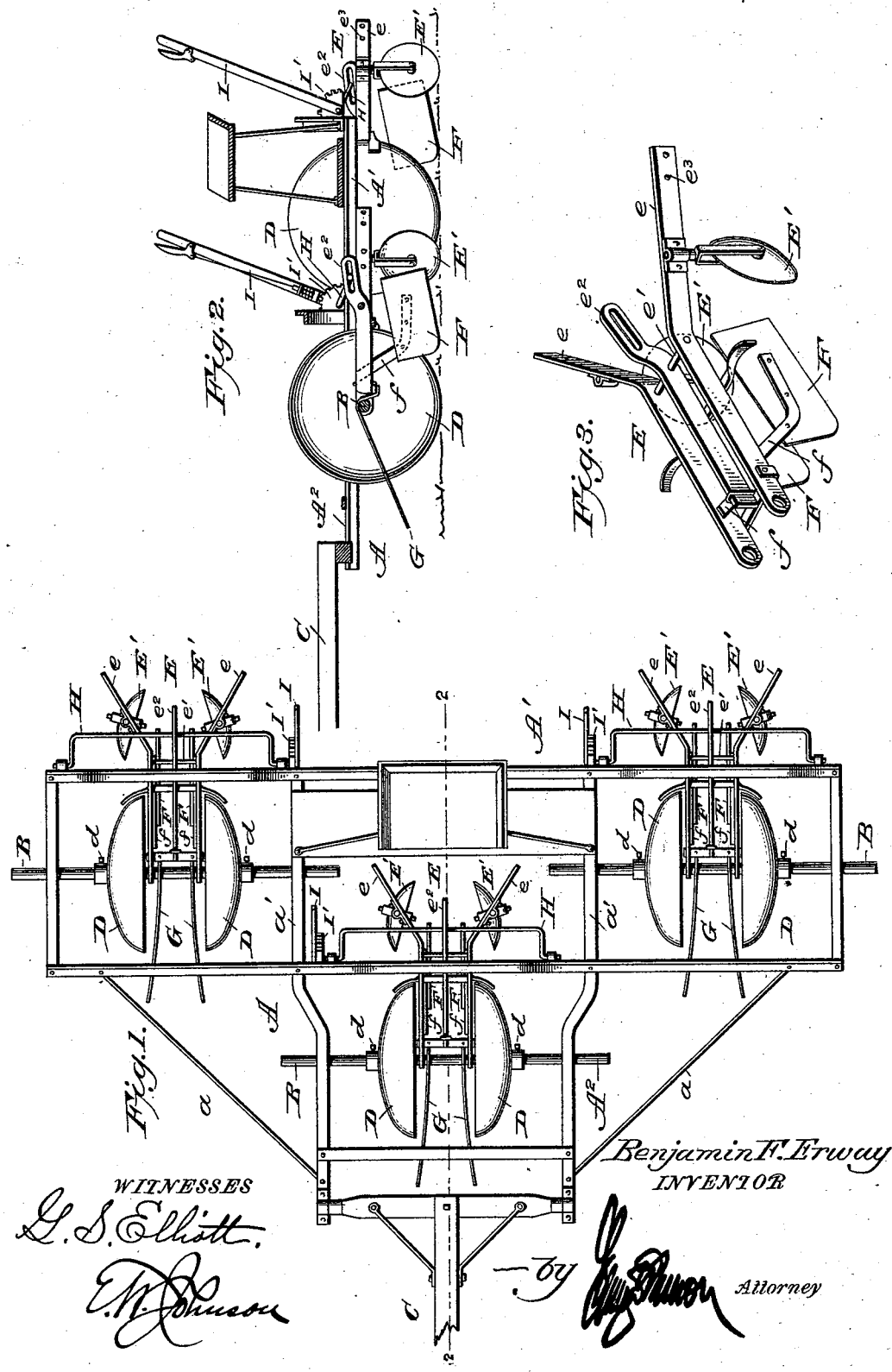

BENJAMIN F. ERWAY, OF MAPLETON, IOWA.

LISTER-CULTIVATOR.

SPECIFICATION forming part of Letters Patent No. 530,755, dated December 11, 1894.

Application filed August 9, 1894. Serial No. 519,857. (No model.)

*To all whom it may concern:*

Be it known that I, BENJAMIN F. ERWAY, a citizen of the United States of America, residing at Mapleton, in the county of Monona and State of Iowa, have invented certain new and useful Improvements in Lister-Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap and effective cultivator by means of which at least three rows of growing plants, as corn, may be cultivated to any desired depth; and it consists in the construction and combination of the parts, as will be hereinafter fully set forth and particularly pointed out in the claims.

In the accompanying drawings forming part of this specification, Figure 1 is a plan view of a lister cultivator constructed in accordance with my invention. Fig. 2 is a central longitudinal section on the line 2—2 of Fig. 1, with the draft tongue removed, and Fig. 3 is a detail perspective view.

A designates the frame of the machine which is preferably made up of bars of angle iron and constructed to provide a rectangular rear section A' to which is secured a smaller front section $A^2$, the sections being braced by diagonal brace-rods $a\ a$. To the forward end of the front section the draft tongue C is pivotally connected. The rear section is provided with intermediate cross-bars $a'$ which are extensions of the side bars of the front section, and these bars and the side bars of the rear section support suitable bearings in which are loosely journaled shafts or axles B. Upon the shafts B are adjustably mounted concavo-convex disks D which are positioned on the shafts so that the concave faces of each set will be toward each other, and they are connected to said shafts by set screws $d$ so that they can be adjusted thereon to any desired distance apart.

E E designate the cultivator frames which are each preferably made up of two beams $e\ e$ loosely mounted at their forward ends upon the shaft B between the concavo-convex disks D, the beams being rigidly secured to each other by cross-bars $e'\ e'$ to which is secured a rearwardly-projecting arm $e^2$ by means of which the cultivator frame is raised and lowered as hereinafter described. The rear ends of the beams $e\ e$ diverge as shown and are provided with bolt-holes $e^3$ through which pass bolts for connecting the disk-cultivators E' thereto.

To the beams $e\ e$ of the cultivator frames are rigidly secured depending bars $ff$ to which are attached fenders F F, said fenders preventing the soil being thrown on the plants.

G G designate forwardly and downwardly extending arms which extend from the shafts B and project in front of the concavo-convex disks for straightening up the growing plants when they have been knocked down.

Upon the rear section of the frame of the machine rear of each shaft or axle B are mounted rock-shafts H having loop portions to which are connected the arms $e^2$ which extend from the cultivator frames E, and at one end of each shaft is rigidly secured an operating lever I having a sliding pawl of ordinary construction which is adapted to engage with a segment-rack I' secured to the frame so as to hold the lever in an adjusted position. By operating the levers I the shafts H will be rocked and by means of the arms $e^2$ connected thereto will raise and lower the cultivator frames to cause the cultivators to enter the soil to the desired depth.

It will be noted that the principal parts of this device are made up of metal, and that at a suitable point is mounted the driver's seat. The main frame of the machine is preferably constructed of angle iron while flat bars and rods make up the other parts.

In operation the horses are hitched to the cultivator so that they will walk between the rows, and the concavo-convex disks are set upon their shafts so that their outer or convex faces will lie within the furrows in which the plants grow, and as the shafts extend beyond the bearings and are loosely mounted therein these disks can have a lateral play or movement so as to adapt themselves to any irregularity of the furrows, the cultivators moving laterally with the shafts and disks. The plants pass under the shafts between the concavo-convex disks and the disk-cultivators will cut the soil from the side of the furrows so as to cultivate the same adjacent to the plants, the fenders preventing the soil being thrown upon said plants.

It is obvious that the disk-cultivators can be adjusted to the desired depth by manipulating the levers attached to the rock-shafts, said levers all being within easy reach of the driver.

Having thus described my invention, what I claim as new, and desire to secure by Letters Patent, is—

1. In a lister cultivator, a frame having bearings for laterally movable shafts, concavo-convex disks mounted on said shafts, rock-shafts journaled on the main frame and connected to operating levers, and cultivator frames supported at their forward ends upon the laterally movable shafts and connected at their rear ends to the rock-shafts, substantially as shown and for the purpose set forth.

2. The combination in a lister cultivator, of a frame constructed substantially as shown, shafts loosely mounted in bearings and provided with concavo-convex disks adjustably mounted on said shafts, and cultivator frames supported upon the shafts between the concavo-convex disks.

3. The combination in a lister cultivator, of a frame constructed substantially as shown, shafts B journaled in bearings supported by the frame, concavo-convex disks adjustably mounted on said shafts, cultivator frames carrying cultivators supported upon the shafts B, together with rock-shafts having operating levers, the cultivator frames being connected to said rock-shafts, substantially as shown and for the purpose set forth.

In testimony whereof I affix my signature in presence of two witnesses.

BENJAMIN F. ERWAY.

Witnesses:
HENRY K. RISER,
G. D. HOAR.